US011186437B2

(12) United States Patent
Mathi et al.

(10) Patent No.: US 11,186,437 B2
(45) Date of Patent: Nov. 30, 2021

(54) SUSPENSION CONVEYOR SYSTEM FOR SORTING PRODUCTS

(71) Applicant: KNAPP AG, Hart bei Graz (AT)

(72) Inventors: Franz Mathi, Hart bei Graz (AT); Heiko Süss, Hart bei Graz (AT); Doris Elebracht, Bielefeld (DE); Thomas Schnadwinkel, Bielefeld (DE); Michael Wend, Bielefeld (DE)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 16/637,267

(22) PCT Filed: Aug. 6, 2018

(86) PCT No.: PCT/AT2018/060178
§ 371 (c)(1),
(2) Date: Feb. 6, 2020

(87) PCT Pub. No.: WO2019/028485
PCT Pub. Date: Feb. 14, 2019

(65) Prior Publication Data
US 2020/0247610 A1 Aug. 6, 2020

(30) Foreign Application Priority Data
Aug. 8, 2017 (AT) .............................. A50661/2017

(51) Int. Cl.
*B65G 1/04* (2006.01)
*B65G 19/02* (2006.01)
(Continued)

(52) U.S. Cl.
CPC ......... *B65G 1/0478* (2013.01); *B65G 1/0457* (2013.01); *B65G 1/1371* (2013.01);
(Continued)

(58) Field of Classification Search
CPC .. B65G 1/0478; B65G 1/0457; B65G 1/1371; B65G 19/025; B65G 2203/0266;
(Continued)

(56) References Cited

U.S. PATENT DOCUMENTS 9,630,751 B1* 4/2017 Otto .................... B65G 17/485
2006/0278501 A1* 12/2006 Sweazy .................. B07C 3/082
198/890

(Continued)

*Primary Examiner* — Gene O Crawford
*Assistant Examiner* — Lester Rushin, III
(74) *Attorney, Agent, or Firm* — Jonathan Kidney; Intelink Law Group, P.C.

(57) ABSTRACT

A suspension conveyor system for sorting products, having a plurality of conveyor bags for at least one product. The conveyor bags may be moved along a continuous closed conveyor path, wherein the suspension conveyor system comprises conveyor means, configured to move the conveyor bags, at least one loading source, configured to load the conveyor bags with the at least one product, a control unit, configured to control the conveyor means, and at least one first unloading line having a plurality of unloading positions along a first closed conveyor path.

At least one further unloading line is arranged having a plurality of unloading positions along at least one further closed conveyor path, wherein the at least two closed conveyor paths are connected to one another via at least two gates, wherein the conveyor bags may be controlled, independently from one another, in regard to the conveyor path using the conveyor means.

20 Claims, 2 Drawing Sheets

(51) Int. Cl.
*B65G 1/137* (2006.01)
*B65G 47/04* (2006.01)
*B65G 47/44* (2006.01)

(52) U.S. Cl.
CPC ........... *B65G 19/025* (2013.01); *B65G 47/04* (2013.01); *B65G 47/44* (2013.01); *B65G 2203/0266* (2013.01); *B65G 2203/046* (2013.01); *B65G 2814/0302* (2013.01)

(58) Field of Classification Search
CPC .. B65G 2203/046; B65G 47/04; B65G 47/44; B65G 2814/0302
See application file for complete search history.

(56) References Cited

U.S. PATENT DOCUMENTS

2020/0172346 A1* 6/2020 Sigrist ..................... B07C 5/38
2021/0149382 A1* 5/2021 Stadie ................... G05D 1/0297

* cited by examiner

SUSPENSION CONVEYOR SYSTEM FOR SORTING PRODUCTS

CROSS-REFERENCE TO RELATED APPLICATION(S)

This application is a National Stage application under 35 U.S.C. 371 of PCT Application no. PCT/AT2018/060178 filed Aug. 6, 2018, claiming priority to Austrian Application No. A50661/2017 filed Aug. 8, 2017, and claims the benefit thereof and wherein the contents of which are hereby incorporated by reference in their entirety.

FIELD

The invention relates to a suspension conveyor system for sorting products, comprising a plurality of conveyor bags.

BACKGROUND

The document DE 602 20 273 T2 discloses a system for sorting articles along a closed cycle- or loop-like conveyor path. With such sorting systems, the articles are picked up by transport units and moved by conveyor means along the conveyor path. The transport units, which are usually embodied as transverse belts or tilt-trays, are situated in a mutually dependent order at a determined position of the conveyor means. The articles are supplied to the transport units at supplying stations, wherein there may be supplied only one product after the other at a supplying station. Even if there were realized several supplying stations, the through-put of the system could not be markedly improved, as long as there is not arranged a plurality of retrieval stations along the conveyor path between or downstream of the supply stations, in order to enable that at least some of the transport units may be unloaded. The retrieval stations may provide for up to 50 percent of the total investment in mechanics and up to two thirds of space, depending on the sorting system. The retrieval stations and the design thereof further have an essential impact on the performance of the overall system.

Another disadvantage of the systems already known is that in the case of high through-put, the required conveyor rate of the conveyor means will lead to centrifugal forces, which negatively affect the supply and the retrieval of the products, in particular in the case of transverse belts or tilt-trays. For this reason, supply and retrieval stations that are laterally arranged along the conveyor path are only possible up to a limited conveyor rate, as otherwise no correct assignment with the transport unit will be possible or products may be damaged when being deposited.

The invention relates to a suspension conveyor system for sorting products, comprising a plurality of conveyor bags for at least one product, wherein the conveyor bags may be moved along a continuous closed conveyor path, wherein the suspension conveyor system has conveyor means, which are configured to move the conveyor bags, at least one loading source, which is configured to load the conveyor bags with at least one product, and at least one first unloading line having a plurality of unloading positions along a first closed conveyor path.

The invention is based on the task to provide a system and a method for sorting products with high through-put along a continuous closed conveyor path, wherein the disadvantages mentioned above are at least reduced.

SUMMARY

In summary, the suspension conveyor system according to the invention advantageously is especially easy to install, it is low in energy and maintenance, provides for a flexible and space-saving design as well as conveying and sorting at high through-put.

According to the invention, this task is solved by providing a suspension conveyor system, characterized by at least one further unloading line having a plurality of unloading positions, which are arranged along at least one further closed conveyor path, wherein the at least two closed conveyor paths are connected to one another via at least two gates, wherein the conveyor bags may be controlled, independently from one another, in regard to the conveyor path using the conveyor means.

This task is solved by a method, wherein the unloading line is arranged along a closed conveyor path, which passes at least two gates, wherein in the operating condition, the conveyor bag is controlled along the unloading line in regard to a vertical axis above the desired unloading position and the product is dispatched, by means of gravity, from the conveyor bag into the desired unloading position in an automatic and positionally accurate way.

The invention further relates to a method for sorting products along a continuous closed conveyor path having a suspension conveyor system, which comprises a plurality of conveyor bags for at least one product, having the following method steps:
 Automatic or manual loading of a conveyor bag with at least one product at a loading source;
 Moving the conveyor bag using conveyor means and controlling at least one desired unloading position by means of a control unit, which at least one unloading position is arranged along an unloading line;
 Depositing the at least one product at the desired unloading position.

The suspension conveyor system according to the invention advantageously allows that a plurality of retrieval positions is arranged along the closed conveyor path and that, simultaneously, space consumption and total investment may be reduced. In addition, the flexibility in regard to the design of the retrieval positions and, hence, the entire suspension conveyor system is increased. Use according to the invention of the conveyor bags, which may be controlled and moved, independently from one another, in regard to the conveyor path itself via the gates at high conveyor rates, may advantageously increase the through-put of sorting, wherein the correct assignment of the products will be kept at any point of time.

The first closed conveyor path is preferably configured as a major loop, and any further closed conveyor path is configured as a minor loop, wherein at least one minor loop diverges from the major loop via a gate and ends in the major loop via a gate. In this way, there is advantageously possible a space saving, simple and clear arrangement of the unloading lines.

If there are arranged, as a consequence, at least two further unloading lines that are arranged essentially in parallel to one another, along closed conveyor paths as minor loops, wherein at least one minor loop diverges from another minor loop via a gate and ends in this minor loop via a gate, then there may be advantageously realized a high number of different designs of the retrieval positions. In addition, there may be realized separations between individual unloading lines, for example, in order to enable product sorting within the unloading lines. There may be arranged a substantially infinite number of unloading lines along closed conveyor paths, which are preferably configured as minor loops.

The conveyor bags according to the invention preferably have identification means, in particular RFID chips. In this way, each conveyor bag and, hence, fundamentally any product may be identified at any point of time, whereby proneness to failures of the suspension conveyor system and of the associated method is dramatically reduced.

In a preferred embodiment, the suspension conveyor system comprises at least one storage carousel for the temporary storage of empty or loaded conveyor bags. In this way, there is obtained the advantage that an especially space-saving and clear possibility of an automated temporary storage and/or buffer storage is being enabled.

In a preferred embodiment, the suspension conveyor system has at least one matrix sorter for sorting the conveyor bags into a desired order.

In an especially preferred embodiment, the storage carousel is arranged along a minor loop and/or the matrix sorter is arranged along a minor loop, wherein each minor loop diverges from the major loop and ends in the major loop via gates. In this way, a space-saving, simple and clear arrangement of storage carousel and/or matrix sorter is possible.

In an especially preferred embodiment, in the operating condition the conveyor means are arranged in the region of the loading source in regard to the perpendicular vertical axis underneath at least one loading position, whereby each product may be dispatched, by means of gravity, into any or a desired conveyor bag in an automatic or manual and positionally accurate way. Hence, the complete sorting, from loading to retrieving the product, may be realized in a completely automated way, which increases the through-put and reduces proneness to failures as well as costs.

The conveyor bags are configured to be automatically closed and opened. It has proven to be advantageous in a preferred embodiment that in the operating condition the conveyor means are arranged along the unloading lines in regard to a perpendicular vertical axis above the unloading positions, whereby each product, by means of gravity, may be dispatched from the conveyor bag into any unloading position or into a desired unloading position in an automatic and positionally accurate way. With the appropriate design of conveyor means, conveyor bag and unloading position, the probability may be further reduced that the product be damaged when being deposited.

The unloading positions are preferably configured to be movable in the unloading lines, for example, as containers. In this way, transporting off the unloaded products may be advantageously automated and accelerated, in particular if there is provided in addition an unloading control system, which is configured to position the movable unloading positions underneath the unloading lines and/or to move these using an unloading position conveyor means, for example, a belt conveyor.

The suspension conveyor system is especially preferably configured to dispatch the products into moving unloading positions, wherein the direction of movement of the unloading positions is preferably in the same sense or counter-sense to the conveyor path of the unloading lines. The movable unloading positions, for example, the containers, may then be moved by way of the unloading position conveyor means, for example, the belt conveyor, underneath the unloading lines, and the products may be automatically dispatched into the respective movable unloading positions.

In a further preferred embodiment the unloading control system is configured to temporarily store the unloading positions that are not required in an unloading position storage, for example, in the form of a level- or corridor-bound automated rack system, and/or to control the unloading positions provided for a dispatch to the unloading lines. The number of the unloading positions and the efficiency of unloading the products may thus be optimized.

Further advantageous embodiments of the suspension conveyor system according to the invention and the method according to the invention are explained in greater detail in the following by way of the figures.

DETAILED DESCRIPTION

Figure 1:
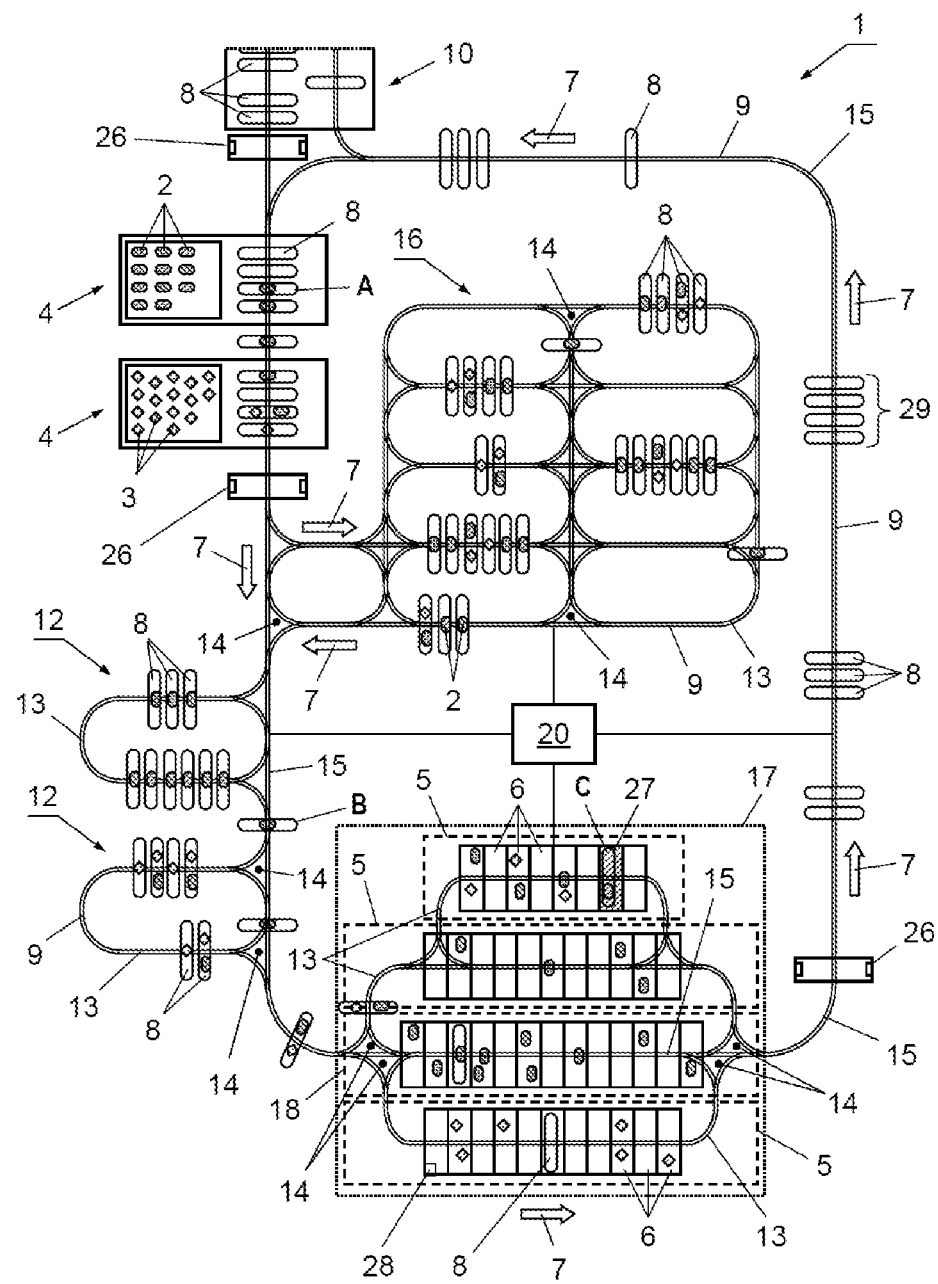
FIG. 1 shows in a top view a schematic depiction of a suspension conveyor system according to the invention for sorting products according to a first embodiment.

In regard to FIG. 1, a suspension conveyor system 1 for sorting products 2 and 3 has two loading sources 4 and three unloading lines 5 having a plurality of unloading positions 6, which are connected to one another by a continuous closed conveyor path 7. A plurality of conveyor bags 8 may be controlled, independently from one another, in regard to the respective conveyor path 7, which is assigned thereto by a control unit 20, using conveyor means 9 and are moved along this conveyor path 7, which may extend, for example, from a loading source 4 to an unloading position 6. Thereby, they are moved at a conveyor rate, which enables a very high through-put of up to several tens of thousands of conveyor bags 8 per hour. The suspension conveyor systems 11 may thus be operated by the control unit 20 using well-known and common hardware and software for data processing, for example, a material flow software, in order to perform the inventive method for sorting the products 2, 3, as described further below.

Alternatively, a pair of or several neighbouring conveyor bags 8 may be connected to one another and moved as a transport unit 29. The number of the elements to be controlled and, hence, the complexity of the suspension conveyor system 1 may thus be reduced.

In the present embodiment, the continuous closed conveyor path 7 extends along a major loop 15 counter-clockwise. The conveyor path 7 may advantageously also extend optionally in any other possible direction, and it may also change direction for a short or longer time.

At each loading source 4, the products 2 and 3 may be introduced, in the present embodiment directly along the major loop 15, into the conveyor bags 8. This may be realized in a manual or automated way using further conveyor technology. Thereby, there may be introduced at every loading source 4 exactly one type of product 2 or 3 or several different products 2 and 3. The conveyor bags 8 may be already situated, as previously unloaded empty conveyor bags 8, in the continuous closed conveyor path 7, or they are introduced, for example, from the conveyor bag storage 10 or at the loading source 4, additionally manually or automatically into the conveyor path 7.

If loading the conveyor bags 8 takes longer than allowed by the conveyor rate, then the conveyor bags 8 may also be introduced via loading sources 4, which are not situated directly at the major loop 15 and which are connected to the major loop via a gate 14 (not depicted in FIG. 1). Even in this case, however, the conveyor rate may be higher than with systems having transverse belts or tilt-trays, as the products 2 and 3 are already in the conveyor bag 8 when entering the major loop 15, whereby the assignment will always be kept even in the case of high conveyor rate with respective centrifugal forces.

Figure 2:
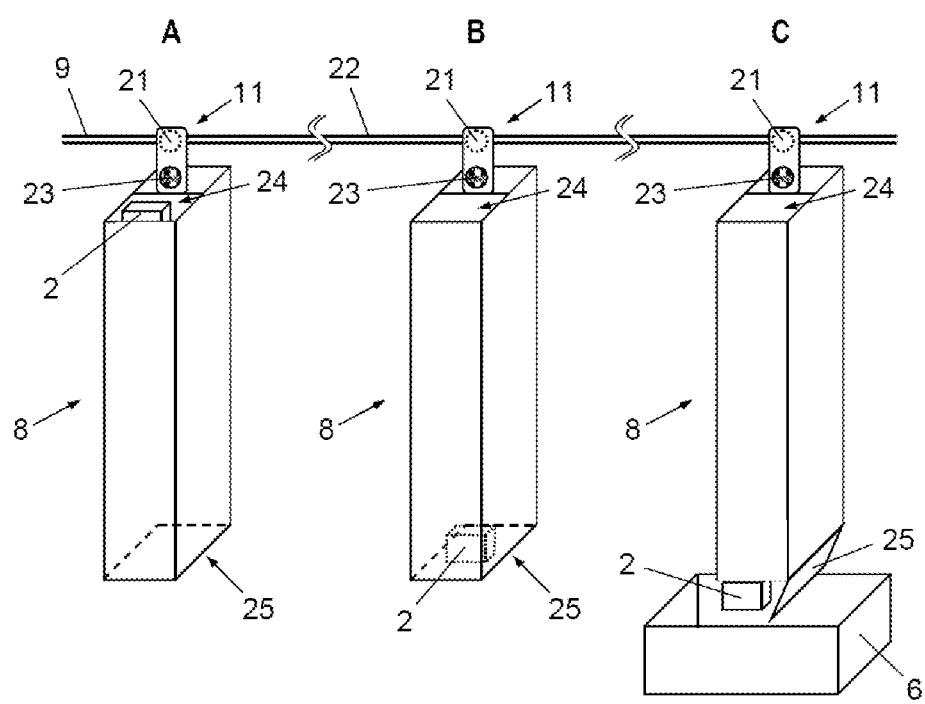
FIG. 2 shows in a perspective front view a schematic depiction of a conveyor bag in three different method steps.

The conveyor means 9 are, for example, configured as chain conveyors, clip conveyors or pin conveyors, being continuously driven by an electric motor (not depicted). The conveyor bags 8 are then entrained, for example, at an adaptor 11, which is depicted in FIG. 2, automatically by the conveyor means 9, once the conveyor bags 8 have been introduced into the conveyor path 7. Due to the compactness of the conveyor bags 8, the conveyor path 7 may advantageously also be used as a buffer storage.

In order to make available further buffer capacity, the suspension conveyor system 1 has two storage carousels 12 for the temporary storage of empty or loaded conveyor belts 8, wherein each storage carousel 12 is arranged along a minor loop 13, which diverges from the major loop 15 and ends in the major loop 15 via the gates 14. These storage carousels 12 may also serve for (pre-) sorting the products 2 and 3. The storage carousels 12 enable, among others, that a product 2 or 3 is temporarily removed from the major loop 15 in order to prevent, for example, a complete or partial blocking of the major loop 15 or in order to remove certain product categories temporarily from the major loop 15 or introduce these from the storage carousel 12 into the major loop 15. In the example depicted according to FIG. 1, the conveyor bags 8 are moved preferably in the same sense as the conveyor path 7, whereby they are, for example, via the first gate 14 of the associated storage carousel 12, diverged from the major loop 15 and introduced, via the second gate 14 of the associated storage carousel 12, into the major loop 15, wherein "first gate 14" and "second gate 14" refer to the fact which gate 14 along the conveyor path 7 will be passed first and which gate 14 will be passed second. Any possible collisions with conveyor bags 8, which are moved along the major loop 15, may be excluded by means of appropriate control of the conveyor bags 8. Alternatively, the minor loop/s 13 of one or all storage carousels 12 may be configured to be shifted away from the major loop 14, according to FIG. 1, for example, shifted to the left on the page plane, such that the minor loop/s 13 form/s a loop that is closed and independent from the major loop 14, which in turn is connected to the major loop 15 via gates 14. In this way, the conveyor bags 8 may be moved along the minor loop/s 13 in the same sense or counter-sense to the conveyor path 7, wherein any possible collisions with conveyor bags 8, which are moved along the major loop 15, are excluded right from the start.

For a further and/or better (pre-) sorting of the conveyor bags 8, the suspension conveyor system 1 has a matrix sorter 16, which is arranged along a minor loop 13, which diverges from the major loop 15 and ends in the major loop 15 via the gates 14. The matrix sorter 16 enables, preferably in combination with a respective software solution, to bring the products 2 and 3 into a desired order. For example, sets or orders may be formed from different products 2 and 3, and any post-sorting at the unloading position 6 or later on may be omitted. In the matrix sorter 16, the conveyor bags 8 may be moved exclusively along the conveyor path 7, this is counter-clockwise, or alternatively along and/or opposite to the conveyor path 7, this is clockwise and/or counter-clockwise. The matrix sorter 16 preferably has a modular set-up and may be adjusted and expanded to the spatial requirements and/or at the system requirements.

The products 2 and 3 are dispatched at the unloading positions 6, for example, into crates or boxes. The unloading positions 6 are arranged within an unloading region 17 along unloading lines 5. Thereby, a first unloading line 18 is situated along the major loop 15, which represents a first closed conveyor path 7. Three further unloading lines 5 having a plurality of unloading positions 6 are arranged along further closed conveyor paths 7. Each of these further closed conveyor paths 7 is configured as a minor loop 13. Two of these minor loops 13 diverge from the major loop 15 via a gate 14 and end in the major loop 15 via a gate 14. The third of these minor loops 13 diverges from one of the two minor loops 13 via a gate 14 and ends in this minor loop 13 via a gate 14. The minor loops 13 are arranged essentially in parallel in the unloading region 17. In the operation condition, the conveyor means 9 are arranged along the unloading lines 5 and 18 in regard to a perpendicular vertical axis above the unloading positions 6. In this way, each product 2 and 3 may be dispatched/deposited by means of gravity from the conveyor bag 8 at/into the desired unloading position 6 in an automatic and positionally accurate way. The term "in the operating condition" means that the suspension conveyor system 1 is set-up and mounted according to the invention and ready-to-use, such that the method for sorting the products 2, 3 may be performed according to the invention. The term "perpendicular vertical axis" is to be construed as a straight line, which is normal to the earth surface and/or the floor screed, floor or similar, on which the suspension conveyor system 1 is situated.

An alternative arrangement of the unloading lines 5 may have any possible configuration, for example, interweaved concentric semi-circles, which each diverge from the major loop via a gate 14 and end in the major loop 15 via a gate 15.

The unloading region 17 according to the invention, which is described in the present embodiment as an example and non-limiting, advantageously provides for an especially flexible and space-saving design of the unloading positions 6.

The conveyor bags 8 are depicted in greater detail in FIG. 2 and may essentially be similar to conveyor bags known from prior art. The conveyor bags 8 are thereby configured to be without drive and are moved by way of the conveyor means 9, which conveyor means 9 are in turn controlled by the control unit 20. In this way, the acquisition costs and the energy consumption may be reduced. Similarly, the control of the suspension conveyor system 1 is in this way markedly simplified, which in turn reduces the hardware and software costs.

Each conveyor bag 8 has on its upper face, this is the face situated on the top in regard to the perpendicular vertical axis, an opening 24, through which the products 2 and 3 are introduced. Alternatively, the products 2 and 3 may be introduced via openings, flaps or similar on any side or surface of the conveyor bag 8. Each conveyor bag 8 has on its lower face, this is the face situated on the bottom in regard to the perpendicular vertical axis, a flap 25 which is configured to be automatically closed and opened, through which the products 2 and 3 may be automatically deposited.

In the depicted embodiment, each conveyor bag 8 has the adaptor 11 having rolling or sliding bodies 21, by the aid of which the conveyor bags 8 may be moved along rails 22 of the conveyor means 9. Thereby, the adaptor 11 engages respectively one drive train of the conveyor means 9, for example, a chain train. The major loop 15 and the minor loops 13 each have a separate chain train, which is moved either clockwise or counter-clockwise, according to the direction that is needed for the respective conveyor path 7. In the region of the gates 14, there are formed only the rails 22 without the chain train, and the conveyor bags 8 will bridge over this distance in a rolling or sliding way up to the next chain train of the major loop 15 or of a minor loop 13. A slope in the region of the gates 14 may thus support this bridging-over. There may be present further regions that are not equipped with a drive train, which may also be provided with a slope.

Each adaptor 11 has identification means, in particular an RFID chip 23. The RFID chip 23 may contain information regarding the products 2 and 3 that are transported in the transport bag 8. For example, there are stored on the RFID chip 23 the identification number of the transport bag 8 and/or the type and number of the products 2 and 3 and/or further information regarding the products 2 and 3. The RFID chip 23 may in particular be written over, such that the RFID chip 23 may be used multiple times, or the RFID chip will permanently store the identification number of the conveyor bag 8, wherein the transported products 2 and/or 3 are assigned by means of the control unit 20 to the respective conveyor bag 8. Alternatively, the identification means may also be embodied as a bar code, barcode or similar.

If the products 2 and 3 are identified in the region of the unloading sources 4, for example, automatically or manually scanned via a bar code, or if the control unit 20 already recognizes the respective products 2 and 3, then this information will be transferred, when loading the conveyor bags 8, to the RFID chip 23 and/or linked by the control unit 20 with the RFID chip 23, and hence with the associated conveyor bag 8. In this way, the exact unloading positions 6 of the conveyor bag 8 and each of the products 2 and 3, which are stored with the control unit 20 in connection with the RFID chip 23 of the respective conveyor bag 8, may be retrieved, thus ensuring the respective conveyor path 7 of each conveyor bag 8 and of each product 2 and 3. This conveyor path 7 may also extend across at least one conveyor carousel 12 and/or the matrix sorter 16. This conveyor path 7 may also extend along two unloading lines 5 via two minor loops 13 if, for example, there are dispatched two products 2 and 3 at two different unloading positions 6 using one conveyor bag 8. There is preferably transported exactly one product 2 or 3 in one conveyor bag 8 to an unloading position 6, as in this way the error rate may be kept the lowest.

In addition, there may be arranged sensor stations 26 along the conveyor path 7 in order to examine the status of the conveyor bags 8 and/or the products 2 and 3 by way of the identification means, in particular the RFID chips 23. In this way, the error rate may be further reduced.

In addition, the unloading positions 6 may be equipped with filling level sensors 28, which register the current number of the products 2 and 3 dispatched or the filling level of the associated unloading positions 6. In this way, the products 2 and 3 may be distributed as uniformly as possible onto all unloading positions 6 or successively onto determined unloading positions 6.

A method according to the invention for sorting products 2 and 3 along the continuous closed conveyor path 7 having a suspension conveyor system 1, which comprises a plurality of conveyor bags 8 for at least one product 2, 3, is described in the following by way of a specific and not limiting example:

In a first method step, the conveyor bag 8 is automatically loaded with a product 2 at the loading source 4, wherein the conveyor bag 8 is passed through, for example, underneath a loading robot (not depicted). The control unit 20 determines the conveyor bag 8 by scanning the RFID chip 23, and the loading robot deposits, the product 2, which is to be deposited according to the data of the control unit 20, into the respective conveyor bag 8 in that moment, in which the conveyor bag 8 passes a loading position of the loading source 4. This situation is depicted in the FIGS. 1 and 2 in position "A". The control unit 20 further recognizes a respective unloading position 28 for the respective product 2 and/or the conveyor bag 8, wherein the respective unloading position 27 is depicted hatched in FIG. 1 for a better understanding thereof.

In a second method step the conveyor means 9 move the conveyor bag 8 to the respective unloading position 27, wherein the control unit 20 controls the respective gates 14 at the correct point of time. A snap-shot of this method step, which takes a certain amount of time, depending on the conveyor path 7, is depicted in the FIGS. 1 and 2 in position "B". Thereby, the control unit 20 must recognize the current position of the conveyor bag 8 essentially at any relevant point of time, this is, for example, if one of the gates 14 has to be controlled. This may be realized by means of the sensor stations 26 and/or by means of a determined order of several conveyor bags 8. In the unloading region 17, the control unit 20 controls two gates 14 in order to move the conveyor bag 8 to the respective unloading position 27 along the unloading line 5 of the minor loop 13.

Alternatively, a number of several identical products 2 may be moved and controlled in a determined order, which may significantly simplify the control algorithm.

Optionally, the conveyor bag 8 may be moved, prior to being moved to the unloading position 27, onto at least one intermediate storage position of the storage carousels 12 and/or moved at least once into the matrix sorter 16. In this way, the conveyor bag 8 with the product 2 may be temporarily stored or brought into a desired order within a compound of several conveyor bags 8.

In a third method step the control unit 20 controls the conveyor bag 8 to automatically and positionally accurately deposit the product 2 at the respective unloading position 27 of the unloading line 5. This situation is depicted in the FIGS. 1 and 2 in position "C". Thereby, the conveyor means 9 in the operating condition are guided along the unloading line 5 in regard to the perpendicular vertical axis above the unloading positions 6 and 27, whereby the product is dispatched, by means of gravity, from the conveyor bag 8 into the respective unloading position 27. The flap 25 of the conveyor bag 8 may, for example, be opened by a trigger (not depicted), which is triggered by the control unit 20 at the appropriate point of time. Upon depositing the product 2, the control unit 20 controls two further gates 14 in the unloading region 17 in order to move the conveyor bag 8 back to the major loop 15.

In a further possible course of the method the control unit 20 registers the successful deposition of the product 2 and updates the respective information of the conveyor bag 8, which is now moved as "empty" along the major loop 15 and is thus available for the next transport. The conveyor bag 8 is consequently moved along a continuous closed conveyor path 7 according to the invention, wherein the conveyor rate is advantageously kept at a very high level at any point of time. The assignment between conveyor bag 8 and product 2 will thus be kept at any point of time.

Another advantage of the method according to the invention by means of the suspension conveyor system 1 is the possibility of prioritization. In this way, for example, by controlling unloading positions 6 along the unloading line 18 of the major loop 15, there may be made possible an overtaking of one or several transport bags 8, which are situated along unloading lines 5 of minor loops 13 or controlled on unloading positions 6 along these unloading lines 5, by way of a prioritized transport bag 8. In this way, short-term prioritized products 2 and 3 may be dispatched in an accelerated way along the unloading line 18 of the major loop 15.

By way of the FIGS. 1 and 2 there was previously described a possible embodiment of the invention. According to the invention the suspension conveyor system 1 may be realized by way of a plurality of possible, more or less similar embodiments. There may vary for example, the number and form, e.g., automatically or manually, of the loading sources 4. The number and the design of the matrix sorter 16 and/or of the storage carousels 12 may further vary. In particular the number and the design of the unloading region 17, of the unloading lines 5, 18 and/or of the unloading positions 6 may vary. Furthermore, the design of the conveyor bags 8 may vary, wherein these may be configured, for example, to be flexible or rigid. All such possible deviations will be covered by way of the previously described embodiment, as those skilled in prior art will recognize these deviation and will be able to imply.

The suspension conveyor system 1 according to the invention and the method according to the invention may be used for sorting, for example, the following products 2 and 3: powdered, fine, coarse or integral raw materials, semifinished goods and packed or unpacked articles of any type, in particular textiles, parcels, letters or similar. The term "sorting" in this regard comprises accordingly also "transporting", "(re-)distributing", "(re)organizing", "categorizing", "bringing into a desired or random order" or similar. Similarly, also clothes of all types on hangers may be hung into the adaptors 11.

An exemplary application of the suspension conveyor system 1 according to the invention and of the method according the invention is the sorting of packages, parcels and letters in a postal distribution centre or a parcel distribution centre.

The invention claimed is:

1. A suspension conveyor system for sorting products, having a plurality of conveyor bags for at least one product, wherein the conveyor bags may be moved along a continuous closed conveyor path, wherein the suspension conveyor system comprises:
conveyor means, which are configured to move the conveyor bags;
at least one loading source, which is configured to load the conveyor bags with the at least one product;
a control unit, which is configured to control the conveyor means; and
at least one first unloading line having a plurality of serially arranged unloading positions along a first closed conveyor path,
wherein at least one further unloading line having a plurality of serially arranged unloading positions, which is arranged along at least one further closed conveyor path, wherein the at least two closed conveyor paths are connected to one another via at least two gates, wherein the conveyor bags may be controlled, independently from one another, in regard to the conveyor path using the conveyor means.

2. The suspension conveyor system according to claim 1, wherein the first closed conveyor path is configured as a major loop and that any further closed conveyor path is configured as a minor loop, wherein the minor loop diverges from the major loop via a gate and ends in the major loop via a gate.

3. The suspension conveyor system according to claim 2, wherein there are configured at least two further unloading lines, arranged substantially in parallel to one another, along closed conveyor paths as minor loops, wherein at least one minor loop diverges from another minor loop via a gate and ends in that minor loop via a gate.

4. The suspension conveyor system according to claim 1, wherein every conveyor bag has identification means, in particular an RFID chip.

5. The suspension conveyor system according to claim 1, wherein the suspension conveyor system has a storage carousel for the intermediate storage of empty or loaded conveyor bags.

6. The suspension conveyor system according to claim 1, wherein the suspension conveyor system has at least one matrix sorter for sorting the conveyor bags into a desired order.

7. The suspension conveyor system according to claim 5, wherein the storage carousel is arranged along a minor loop and/or that the matrix sorter is arranged along a minor loop, wherein each minor loop diverges from the major loop or a minor loop and ends in the major loop or the minor loop via gates.

8. The suspension conveyor system according to claim 1, wherein the operating condition, the conveyor means are arranged in the region of each loading source in regard to the vertical axis underneath at least one loading position, whereby every product may be dispatched into any desired conveyor bag by means of gravity in an automatic or manual and positionally accurate way.

9. The suspension conveyor system according to claim 1, wherein the conveyor bags are configured to be automatically closed and opened.

10. The suspension conveyor system according to claim 9, wherein in an operating condition, the conveyor means are arranged along the unloading lines in regard to a vertical axis above the unloading positions, whereby each product may be dispatched from the conveyor bag into any desired unloading position by means of gravity in an automatic or manual and positionally accurate way.

11. The suspension conveyor system according to claim 10, wherein the unloading positions are configured in the unloading lines as ramps or chutes.

12. The suspension conveyor system according to claim 10, wherein the unloading positions are configured to be movable in the unloading lines, as containers.

13. The suspension conveyor system according to claim 12, wherein there is provided an unloading control system, which is configured to position the movable unloading positions underneath the unloading lines and/or to move these by way of an unloading position conveyor means, in particular a belt conveyor.

14. The suspension conveyor system according to claim 13, wherein the suspension conveyor system is configured to dispatch the products from the conveyor bag by means of gravity into the moving unloading positions, wherein the direction of movement of the unloading positions is-in the same sense or counter-sense to the conveyor path of the unloading lines.

15. The suspension conveyor system according to claim 13, wherein the unloading control system is configured to temporarily store unloading positions that are not required in an unloading position storage, in the form of a level- or corridor-bound automated rack system, and/or to control these for dispatching provided unloading positions to the unloading lines.

16. A method for sorting products along a continuous closed conveyor path having a suspension conveyor system, which comprises a plurality of conveyor bags for at least one product, wherein the following method steps are performed:
- A) Automatic or manual loading of a conveyor bag with at least one product at a loading source;
- B) Moving the conveyor bag using conveyor means and controlling at least one desired unloading position by means of a control unit, wherein the unloading position is serially arranged along an unloading line; and
- C) Depositing the at least one product at the desired unloading position, wherein the unloading line is arranged along a closed conveyor path, which passes at least two gates, wherein the conveyor bag is moved across the at least two gates and wherein in an operating condition the conveyor bag is controlled along the unloading line in regard to a vertical axis positionally accurately above the desired unloading position and the product is dispatched from the conveyor bag into the desired unloading position in an automatic way and by means of gravity.

17. The method according to claim 16, wherein the conveyor bag, prior to being moved to the desired unloading position, is moved into at least one temporary storage position of a storage carousel.

18. The method according to claim 16, wherein the conveyor bag, prior to being moved to the desired unloading position, is moved at least once into a matrix sorter.

19. The method according to claim 16, wherein the unloading positions are configured movable, wherein movable unloading positions provided for a dispatch are controlled by means of an unloading control system to the unloading lines and/or any unloading positions that are not required anymore are temporarily stored in an unloading position storage.

20. The method according to claim 17, wherein the unloading positions are configured movable, wherein movable unloading positions provided for a dispatch are controlled by means of an unloading control system to the unloading lines and/or any unloading positions that are not required anymore are temporarily stored in an unloading position storage.

* * * * *